United States Patent [19]
Bares et al.

[11] Patent Number: 5,291,914
[45] Date of Patent: Mar. 8, 1994

[54] PIERCING VALVE ASSEMBLY FOR PLIERS

[75] Inventors: Jack A. Bares, Chagrin Falls; Gary E. Medved, Lyndhurst, both of Ohio

[73] Assignee: Milbar Corporation, Chagrin Falls, Ohio

[21] Appl. No.: 86,046

[22] Filed: Jun. 30, 1993

[51] Int. Cl.[5] ............... F16L 41/04; F16L 41/06; B25B 7/22
[52] U.S. Cl. ............................. 137/15; 81/423; 137/318; 222/5; 222/83.5; 222/89
[58] Field of Search ............ 81/421, 422, 423; 137/15, 318; 222/5, 82, 83, 83.5, 88, 89, 505, 517

[56] References Cited
U.S. PATENT DOCUMENTS

| | | | |
|---|---|---|---|
| D. 312,199 | 11/1990 | Dlugolecki | D6/52 |
| 2,280,005 | 4/1942 | Petersen . | |
| 2,514,130 | 7/1950 | Jones . | |
| 2,590,031 | 3/1952 | Petersen | 81/418 |
| 2,725,774 | 12/1955 | Tekse | 81/423 |
| 3,395,724 | 8/1968 | Hamel | 137/318 |
| 3,519,188 | 7/1970 | Erhardt, Jr. | 81/423 |
| 3,543,788 | 12/1970 | Mullins | 137/318 |
| 3,698,419 | 10/1972 | Tura | 137/318 |
| 3,915,192 | 10/1975 | Skvarenina | 137/318 |
| 4,112,944 | 9/1978 | Williams | 137/318 |
| 4,669,341 | 6/1987 | Small | 81/423 |
| 4,709,206 | 11/1987 | Edwards et al. | 81/418 |
| 4,853,625 | 8/1989 | Fodali et al. | 324/72.5 |
| 4,872,709 | 10/1989 | Stack | 285/39 |
| 5,014,578 | 5/1991 | Flentge | 81/423 |
| 5,163,462 | 11/1992 | Leemput et al. | 137/318 |

*Primary Examiner*—George L. Walton
*Attorney, Agent, or Firm*—Halter & Griswold Calfee

[57] ABSTRACT

A fluid recovery tool for forming an opening in a pipe, tube, or other fluid-carrying conduit includes a pair of pliers having two handle portions pivotally attached and moveable with respect to each other. Each handle portion of the pliers terminates in a jaw portion, and the jaw portions are located in opposed moveable relation to one another. A piercing valve assembly is removably mounted to the pair of pliers for penetrating the pipe. The piercing valve assembly includes a pair of housing members pivotally attached to each other. One of the pair of housing members receives one of the jaw portions and is removably mounted thereto, while the other of the pair of housing members receives the other of the jaw portions and is removably mounted thereto. The piercing valve assembly further includes a piercing element mounted in the upper housing member for piercing the pipe, and a conduit for fluidly connecting the piercing element with a remote storage container or vessel. The lower housing member is designed to receive and locate the pipe such that the handle portions of the pliers can be manually manipulated together to bring the housing members together and force the piercing member through the wall of the pipe.

23 Claims, 7 Drawing Sheets

PIERCING VALVE ASSEMBLY FOR PLIERS

FIELD OF THE INVENTION

The present invention relates generally to tools for servicing refrigeration, air conditioning and other closed-pressure systems.

BACKGROUND OF THE INVENTION

In an era of increased awareness for the environment, emphasis has been directed toward recovering and/or reusing materials which can be harmful to the environment. For example, some appliances, such as refrigerators, are manufactured using chlorofluorocarbons (e.g., freon) in the refrigeration coils as a means for cooling food products. However, when the useful life of the refrigerator has passed and the refrigerator must be disposed, the freon must be recovered from the refrigerator to prevent harm to the environment. It is believed that freon can have a detrimental affect on the environment when it seeps into the ground, as well as when it evaporates and reacts with oxygen molecules in the ozone layer.

Certain tools have been developed to recover fluids flowing through a closed pressure system, such as in the refrigeration coils of a refrigerator. One such tool is shown and described in Tura, U.S. Pat. No. 3,698,419. Tura discloses a pair of locking pliers of the Vise-Grip TM type having modified jaws which can be clamped around a fluid-carrying pipe. The pipe is located and supported in one V-shaped jaw of the pliers, while a needle-like assembly soldered to the other jaw pierces the pipe when the pliers are squeezed. The fluid is then extracted through a hollow needle and directed to a remote storage vessel or container.

A similar tool is shown and described in Hamel, U.S. Pat. No. 3,395,724. Hamel discloses a pair of blocks which are integrally attached to the jaws of a pair of locking pliers. A pipe or tube is located between semi-circular recessed sections formed in the two blocks and the locking pliers are brought together to clamp and hold the pipe. A handle is then manually manipulated to force a pointed element through the wall of the pipe and thereby pierce the pipe. Fluid can then be introduced into or withdrawn from the pipe using external conduits.

Although the above-described tools provide a certain amount of benefit in being able to puncture a pipe or tube and withdraw the contents therefrom, these tools require the servicer to purchase an additional tool for his or her collection of tools, which thereby increases the servicer's cost of doing business.

Moreover, the above tools appear to modify an existing pair of locking pliers, e.g., "Vise Grips TM", such as by interrupting the commercial manufacturing process of the pliers, removing the pliers from the assembly line, and modifying the jaws of the pliers; or by fixedly securing (e.g., soldering) additional structure onto the finished pliers. In any case, the tool is limited in flexibility in being able to be used for other purposes, such as in general use as a pair of locking pliers. This can also increase the servicer's over-all cost of doing business.

SUMMARY OF THE INVENTION

The present invention provides a new and useful tool which can be used for servicing closed pressure systems, and in particular for the recovery of fluid, e.g., chlorofluorocarbons, within a pipe or tube.

According to the principles of the present invention, the recovery tool comprises a piercing valve assembly adapted to be removably mounted to a pair of pliers. The pliers are preferably of the commercially-available, Vise-Grip TM type, and have a locking function. The pliers include a pair of handles which pivotally cooperate to move a pair of jaws into engagement with one another for gripping and locking around the pipe.

The piercing valve assembly for the recovery tool includes a pair of housing members pivotally attached to each other, and biased outwardly by a spring. One housing member is designed to receive and be removably mounted to one of the jaws of the locking pliers, while the other housing member is designed to receive and be removably mounted to the other of the jaws of the locking pliers. The spring urges the housing members outwardly against the jaws of the locking pliers such that the piercing valve assembly moves in conjunction therewith. A removable locking pin extending between the handles of the pliers retains the piercing valve assembly on the pliers.

A piercing element is mounted in the upper housing member of the piercing valve assembly for piercing a pipe when the pliers are squeezed together. The piercing element comprises a hollow tubular element with a first pointed end extending downwardly from the upper housing member. The piercing element can be easily removed from the upper housing portion when dull or unusable, and can be reversed or replaced, such that an opposite, second pointed end of the piercing element extends downwardly from the housing member for piercing the pipe.

When the recovery tool is to be used to drain fluid from a pipe, the pipe is located within a V-shaped notch formed in the lower housing member of the piercing valve assembly. The pliers are then squeezed together to bring the piercing element into contact with the pipe to pierce the pipe. Fluid flows through the hollow tube of the piercing element to a remote storage container or vessel for recovery. A flexible sleeve surrounding the piercing element seals against the pipe and prevents the fluid from leaking around the recovery tool.

When the recovery tool is not needed, the locking pin can be removed, and the piercing valve assembly can be taken off the pliers. The pliers can then be used in a conventional manner.

Accordingly, it is one advantage of the present invention to provide a fluid recovery tool which can be easily and simply used to drain fluid from a pipe, tube or other fluid-carrying conduit.

It is another advantage of the present invention to provide an attachment for a commercially-available pair of pliers which can be used to recover fluid from a pipe, and which can be easily removed from the pair of pliers when not needed.

Other advantages of the present invention will become further apparent from the following detailed description and accompanying drawings which form a part of this specification.

DETAILED DESCRIPTION OF THE DRAWINGS

DESCRIPTION OF THE PREFERRED EMBODIMENT

Figure 1:
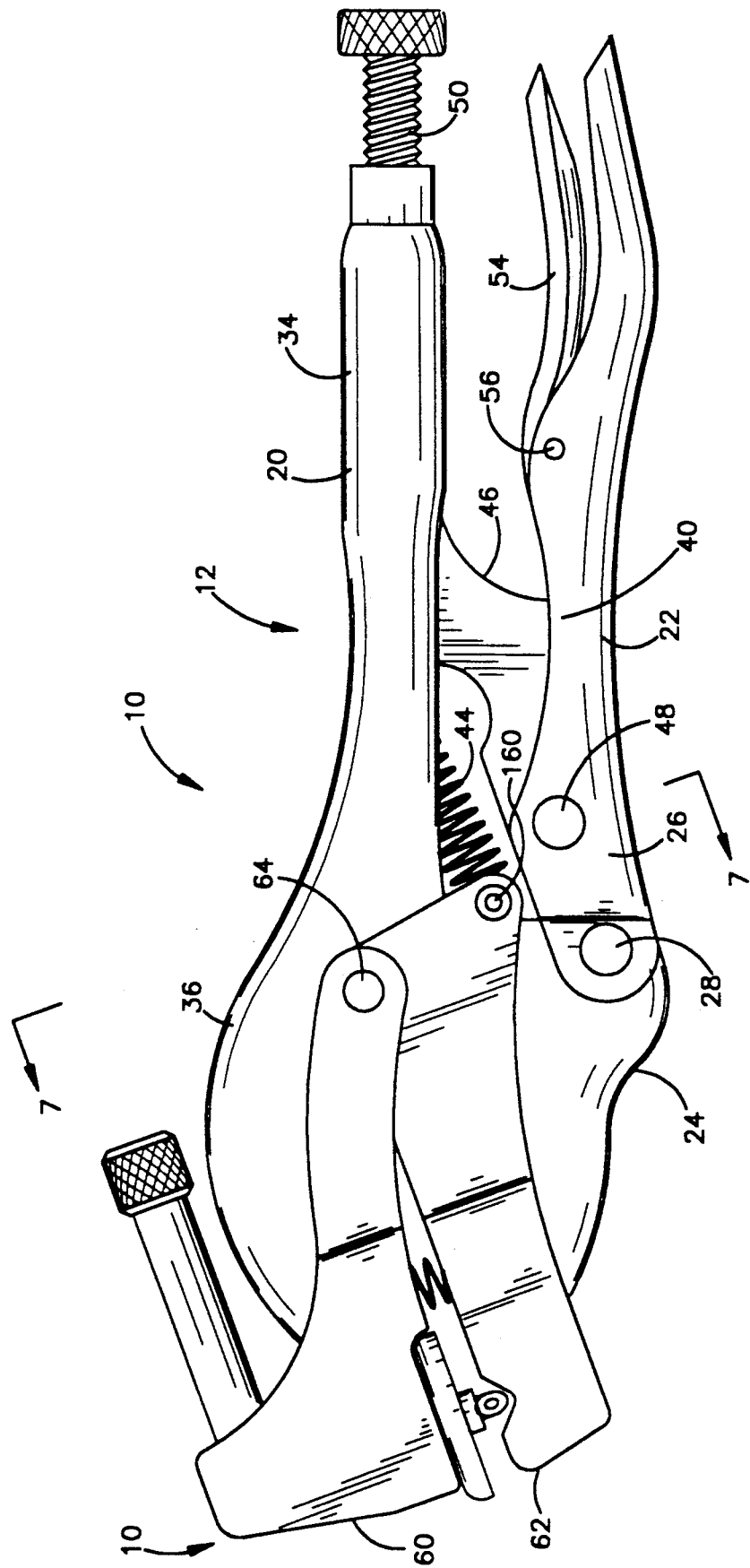
FIG. 1 is a side view of the recovery tool.
Figure 7:
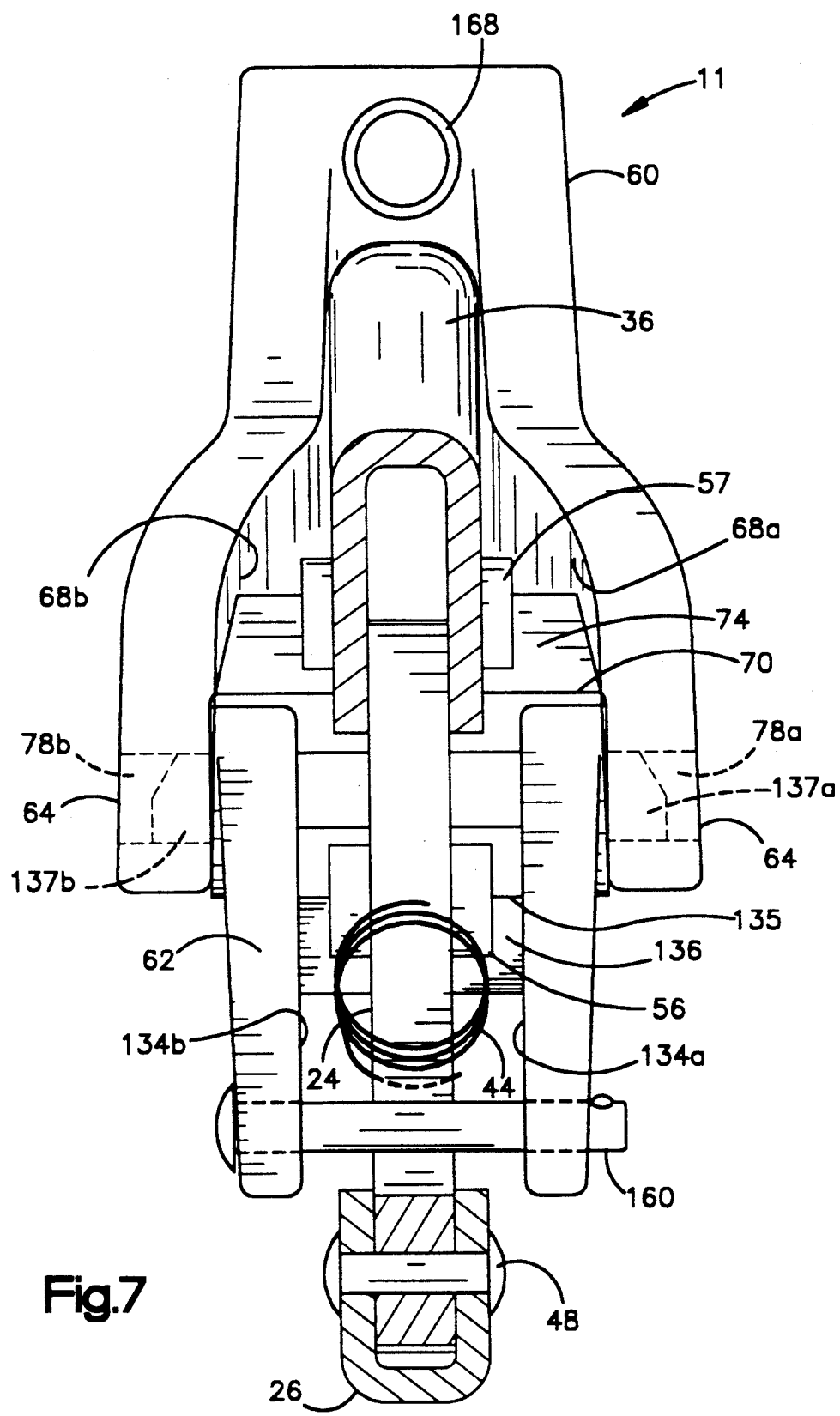
FIG. 7 is a sectional view of the recovery tool taken substantially along the plane described by the lines 7—7 of FIG. 1.
Figure 8:
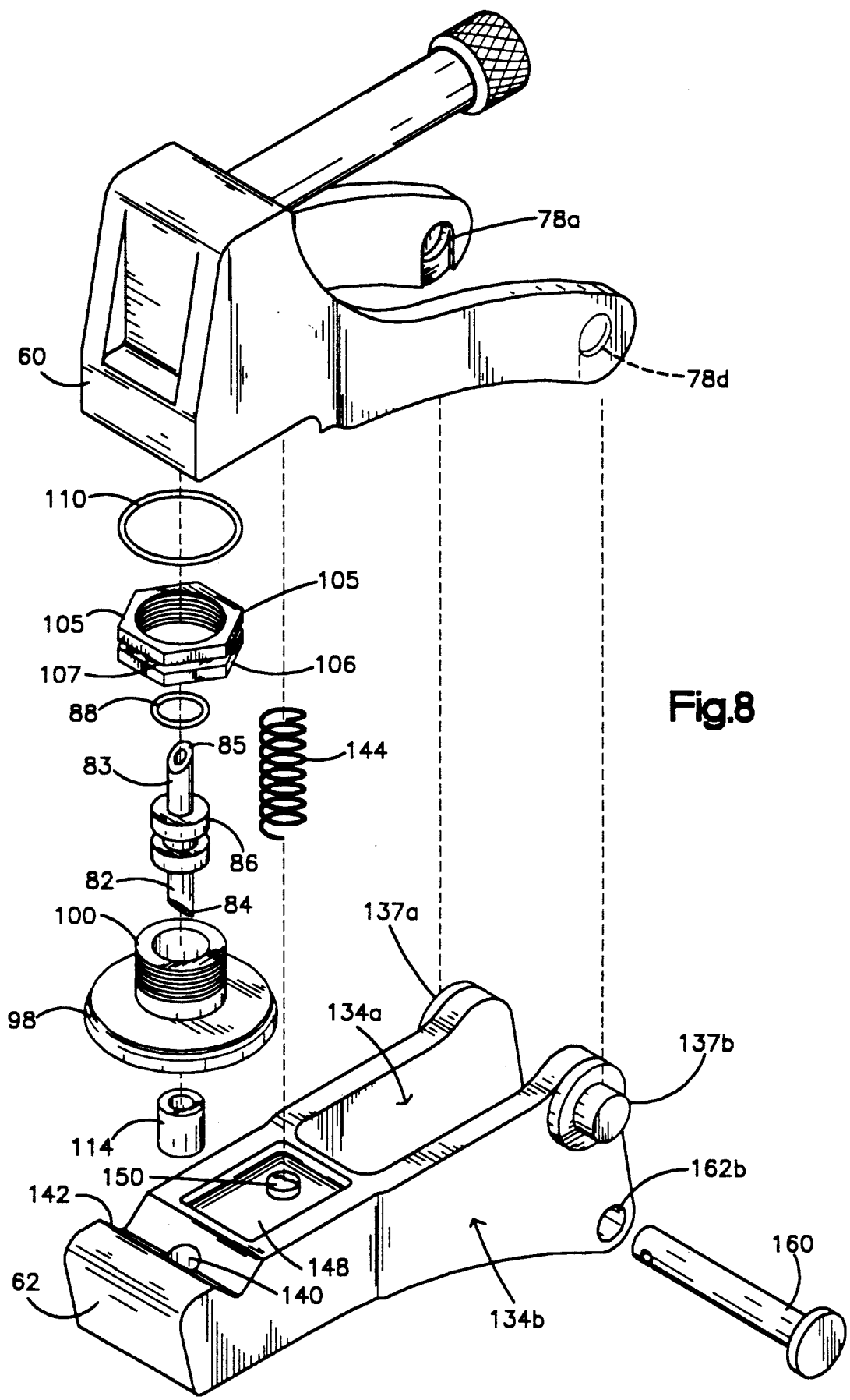
FIG. 8 is a disassembled perspective view of the recovery tool of FIG. 1.
Figure 9:
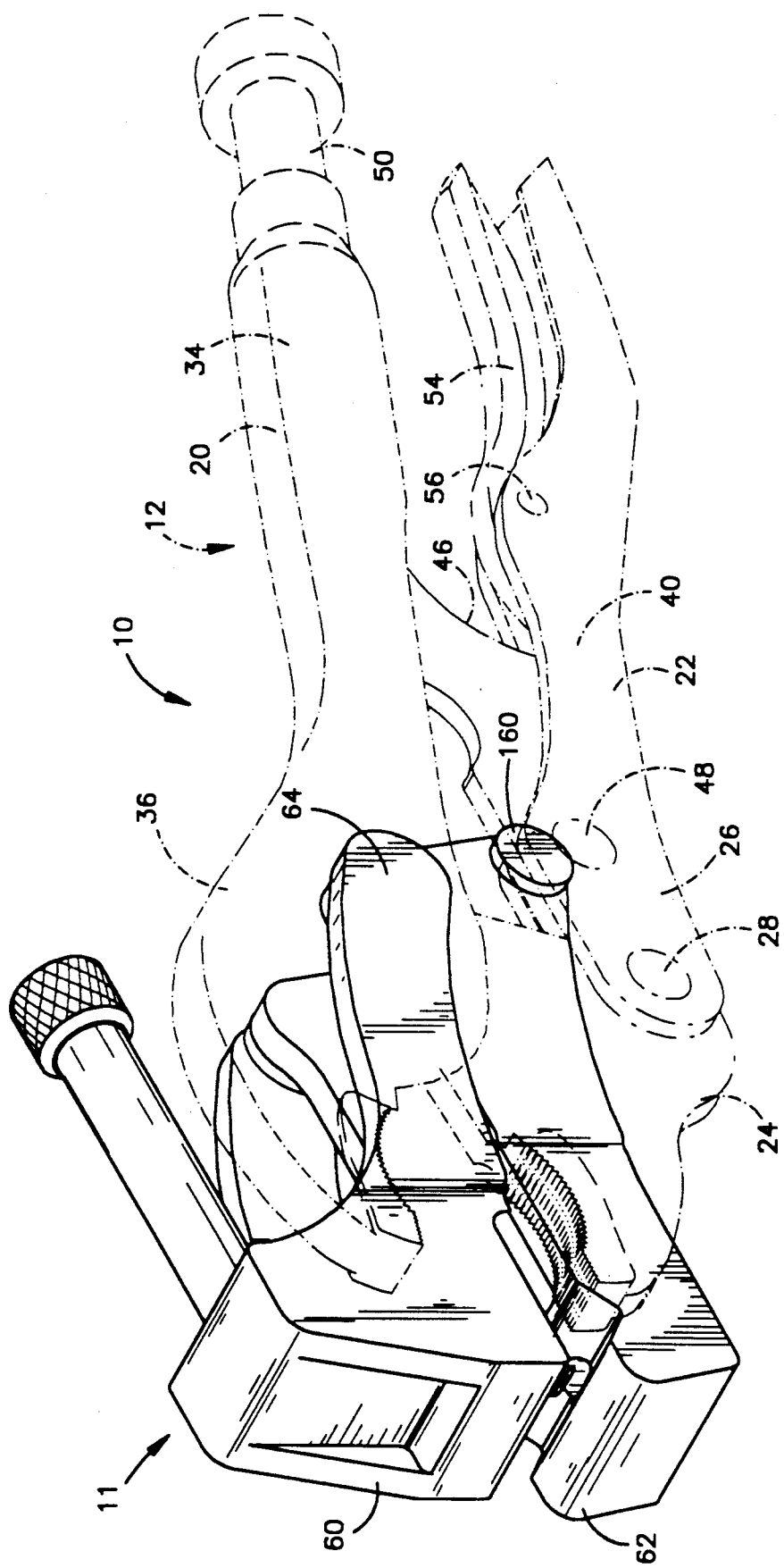
FIG. 9 is a perspective view of the piercing valve assembly of FIG. 1 shown mounted to a pair of pliers (shown in phantom).

Referring to the drawings, and initially to FIGS. 1, 7 and 9, a fluid recovery tool, indicated generally at 8, comprises a piercing valve assembly, indicated generally at 11, which is mounted to a pair of pliers, indicated generally at 12. As will be described herein in more detail, the piercing valve assembly can be simply and easily attached to the pair of pliers for piercing and sealing to a pipe, tube, or other fluid-carrying conduit, and is used for draining the conduit. When the fluid recovery tool is not needed, the piercing valve assembly can be easily removed f rom the pair of pliers, and the pliers then used in a conventional manner.

The pair of pliers 12 f or the present invention are preferably of the commercially-available, locking type, such as marketed under the mark/designation "Vise-Grip TM ", although as should be apparent to those of ordinary skill in the art, any similar type of plier can be used with the present invention with minor modification of the piercing valve assembly. The structure and function of locking-type pliers is well known, and is disclosed in Petersen, U.S. Pat. No. 2,280,005; Jones, U.S. Pat. No. 2,514,130; Hamel, U.S. Pat. No. 3,395,724; and Tura, U.S. Pat. No. 3,698,419, among others.

Generally, the locking pliers 12 comprise a pair of handles 20, 22 which are pivotally related. The lower handle 22 is comprised of lower movable jaw 24 and handle portion 26 pivotally connected at 28, and with the lower jaw 24 pivotally connected at 30 (FIGS. 5, 6) to the upper handle 20. ("Upper" and "lower" are used herein to describe the handles and refer to their positions as depicted in FIG. 1, it being understood that the tool may be used with the handles in any orientation.)

The upper handle 20 comprises a handle portion 34 and an integral, stationary upper jaw 36, on opposite sides of the pivot 30. A spring 44 is connected between the upper handle 34 and the lower jaw 24 to urge the jaws 24, 36 to the open position (see, e.g., FIG. 5).

Figure 6:
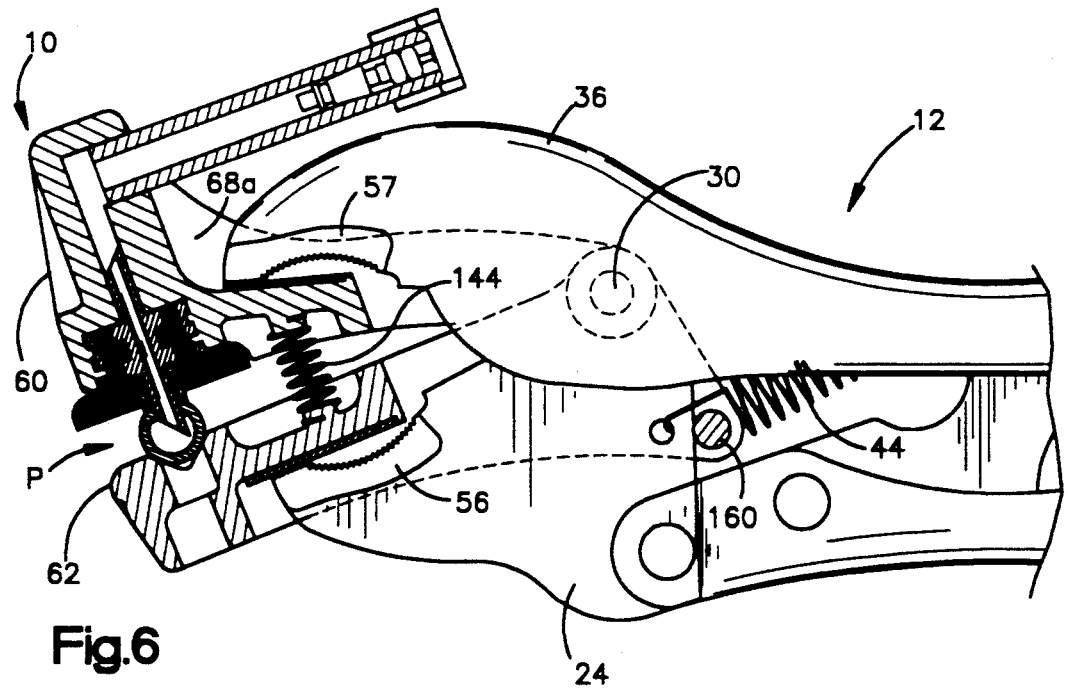
FIG. 6 is a view similar to FIG. 5 with the recovery tool shown penetrating the pipe.

In most commercially-available locking pliers, a toggle-link or dog 46 is pivotally connected at 48 to the lower handle 22. The dog 46 has an end (not shown) engageable with the inner end of an adjusting screw 50 threadedly connected to the upper handle 34. The dog 46 limits the amount the jaws 24, 36 are closed on each other and holds the jaws in a closed position (FIGS. 1, 6). A release lever 54 is pivotally connected at 56 to the lower handle 22, and has an end (not shown) engageable with the dog 46 to release the jaws so that the spring 44 will separate the jaws.

Both the lower and upper jaws 24, 36 have opposed contacting surfaces 56, 57 (FIGS. 5, 6), respectively, which are designed to be brought together to grasp and hold an object, such as a pipe. The contacting surfaces can be curved (as shown) or can be relatively flat. Further, the contacting surfaces can be serrated to facilitate gripping an object.

Figure 5:
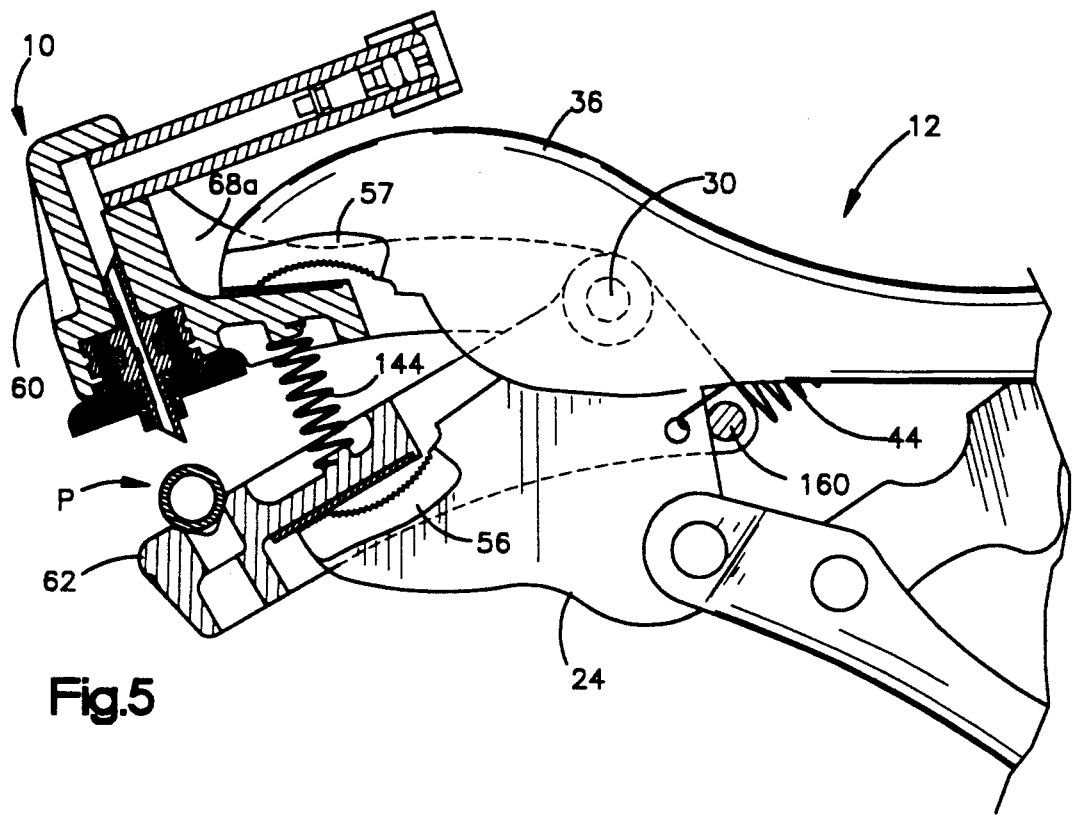
FIG. 5 is a side view taken in partial cross-section of the recovery tool of FIG. 1, just prior to the piercing element penetrating a pipe.

The piercing valve assembly 10 for the recovery tool includes an upper and lower pair of housing members 60, 62, respectively, which are pivotally connected at 64. Again, "upper" and "lower" are used to designate the housing members as they are depicted in FIGS. 5 and 6, and not limiting as to the orientation in which they may be used. The upper and lower housing members are preferably formed from a hard, lightweight material, for example plastic or composite materials (e.g., zytel 70G33L from DuPont), and are designed to be removably mounted to the jaws of the pliers.

To this end, the upper housing member 60 includes a register, indicated generally at 66 (FIG. 2), comprising parallel side walls 68a, 68b interconnected by a bottom wall 70. The side walls 68a, 68b of the register are spaced apart a distance such that the upper jaw 36 fits snugly therebetween (see, e.g., FIG. 7). Additionally, a resilient urethane pad 74 can be applied to the bottom wall portion 70 to facilitate gripping the housing member with the contacting surface of the jaw. The side walls 68a, 68b extend downwardly to apertures 78a, 78b, respectively, formed at the distal end of the upper housing member.

Figure 2:
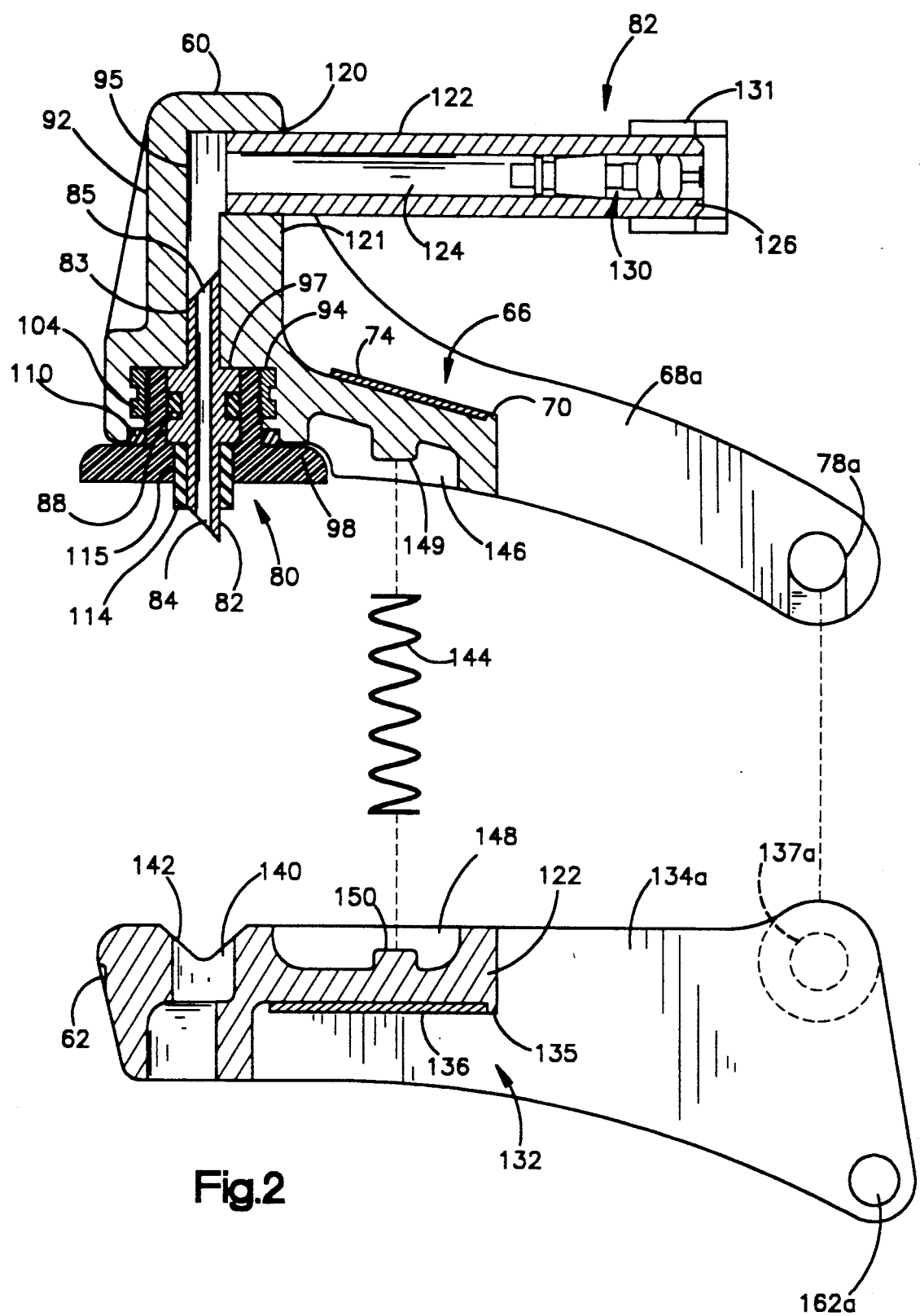
FIG. 2 is a partially disassembled, cross-sectional side view of the piercing valve assembly for the recovery tool of FIG. 1.
Figure 3:
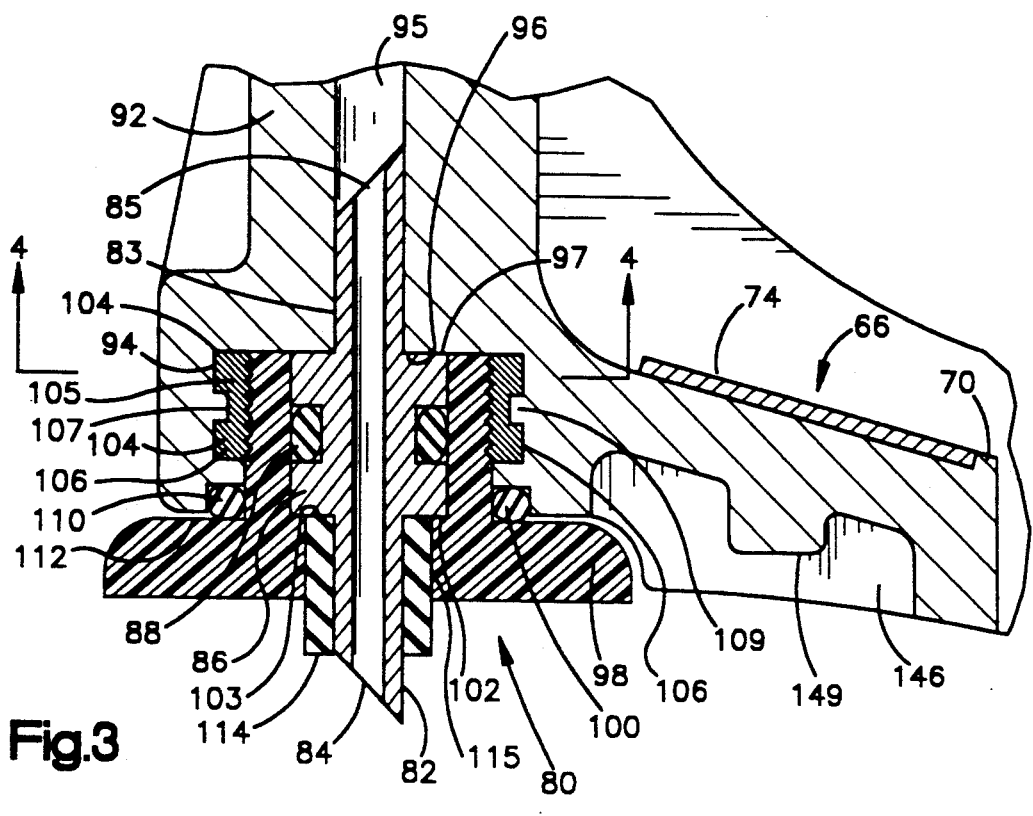
FIG. 3 is an enlarged, cross-sectional side view of the piercing element assembly for the recovery tool of FIG. 1.
Figure 4:
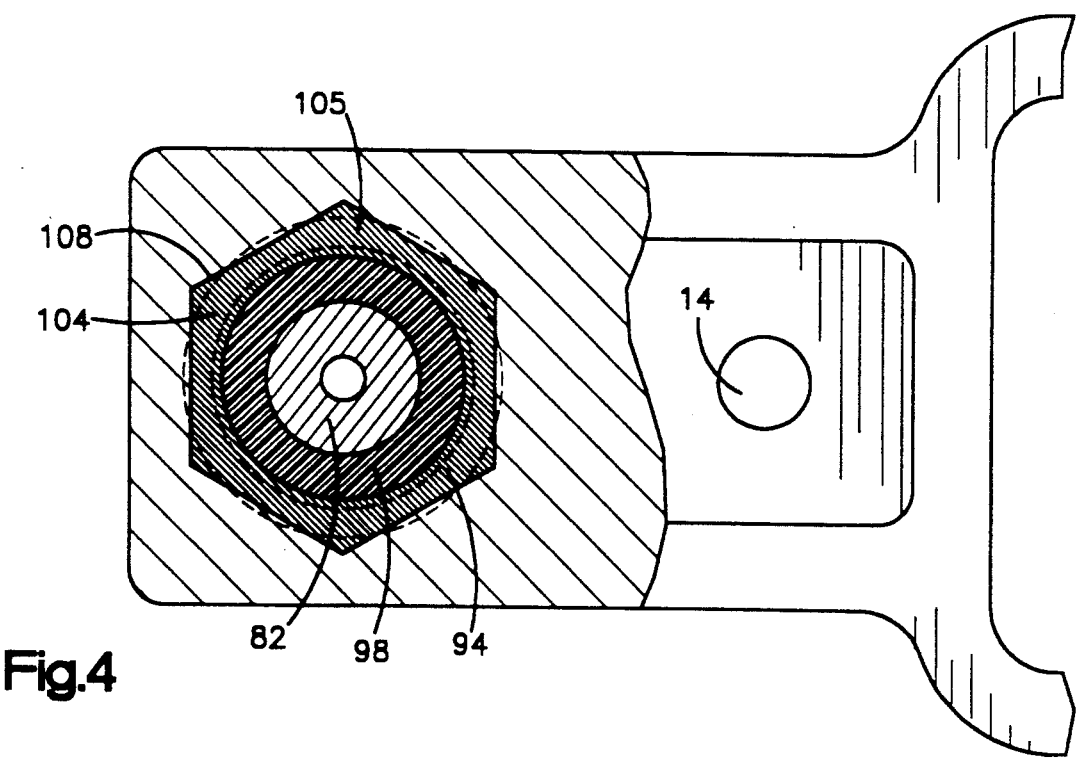
FIG. 4 is a sectional view of the piercing element assembly taken substantially along the plane described by the lines 4—4 of FIG. 3.

Referring now to FIGS. 2 and 3, the upper housing member 60 further includes a piercing element assembly, indicated generally at 80, for piercing and sealing to the pipe and draining fluid out of the pipe. As shown in FIGS. 2–4, 8, the piercing element assembly 80 includes a metal piercing element 82 preferably formed from a low carbon steel such as C1018/20. The piercing element 82 comprises an elongated hollow tube 83 having pointed or sharpened ends 84, 85. An annular body portion 86 is formed integrally along the central portion of the piercing element with an outer diameter which is larger than the outer diameter of the tube 83. The annular body portion 86 includes a central groove (unnumbered) for receiving a flexible rubber O-ring or gasket 88.

The piercing element 82 is mounted within a counterbore 94 formed in the upper housing member 60. The tube 83 of the piercing element extends within a bore 95 extending upwardly from the counterbore 94, with the upper end 96 of the body portion 86 generally abutting the lower surface of shoulder 97. The piercing element 82 is retained within the counterbore 94 by an annular spacer element 98 formed from plastic or composite material (e.g., Zytel) . Spacer element 98 includes a central bore formed in part from tubular side wall 100 which surrounds the annular body portion 86 of the piercing element 82. The side wall 100 of the spacer element 98 includes an inner shoulder 102 which abuts the lower end 103 of the body portion 86 of the piercing element to retain the piercing element in the counterbore. The side wall 100 has a threaded outer surface which is received within the inner threaded bore of hexnut 104 to secure the spacer element to the upper housing member 60.

The hexnut 104 comprises a hex-shaped, brass element having upper and lower flanges 105, 106, which define a central groove 107. The hexnut 104 is received within a hex-shaped opening 108 (FIG. 4) formed in counterbore 94, and is retained therein by lip 109, which extends into central groove 107. The hexnut 104 is located in opening 108 during the initial molding process of the upper housing member 60, and because of the geometry of the opening (i.e., hex-shaped), is fixedly retained therein.

Further, a flexible rubber O-ring or gasket 110 is located within an outer groove (unnumbered) formed in the outer lip 112 of the counterbore 94 to provide a fluid-tight seal between the upper housing member 60 and the spacer element 98.

The piercing element 82 is mounted within the upper housing member 60 by initially locating the piercing element 82 (with O-ring/gasket 88) within the counterbore 94 such that the hollow tube 82 extends centrally within bore 90 of body portion 92. Spacer element 98 (with O-ring/gasket 110) is then screwed into hexnut 104, thereby trapping the annular body 86 of the piercing element 82 within counterbore 94. The length of the annular body 86 can be such that compression is applied to O-ring/gasket 110 when the spacer element 98 is fully screwed into the housing member. The O-rings/gaskets 88, 110 maintain a sealed relationship between the upper housing member and the piercing element and prevent fluid leakage therebetween for the anticipated pressures of the system (between 150-500 psi).

Finally, a flexible rubber sleeve 114 can be inserted within bore 115 in spacer element 98 and secured therein with, e.g., adhesive. The sleeve 114 extends outwardly from the spacer element and partially surrounds the tubular piercing element. As will be described herein in more detail, when the piercing element 82 penetrates a pipe, the sleeve 114 seals to the pipe and prevents fluid leakage around the piercing element.

Referring now to FIG. 2, the bore 90 in the body portion 92 extends upwardly and outwardly from the piercing valve assembly through aperture 120 formed in upper housing side wall 121. A brass valve tube or conduit 122 is received (i.e., threaded) within aperture 120 and extends outwardly therefrom. The valve tube includes a hollow central bore 124 having a slight increase in diameter toward the outer distal end 126 of the valve tube.

A conventional one-way valve assembly, indicated generally at 130, is mounted toward the distal end 126 of the valve tube in the increased-diameter section. The valve assembly 130 is of a commercially-available design, and is preferably manufactured by Arvin Industries, inc., Schroeder Division Automotive Products, Nashville, Tenn., under the mark/designation 7344 Valve Core. Finally, a brass coupling sleeve 131 is attached (e.g., threaded) onto the distal end 126 of the valve tube for connection to a remote container or storage vessel, as will be described herein in more detail.

The bottom housing member 62 of the piercing valve assembly also includes a register, indicated generally at 132, comprising parallel side walls 134a, 134b (FIG. 7) and a bottom wall 135 extending between the side walls. The side walls 134a, 134b are spaced apart a sufficient distance such that the lower jaw 26 fits snugly therebetween. The bottom wall 135 can also have a resilient urethane pad 136 layered thereon. The lower urethane pad 136 creates a tight fit with the contacting surface 56 of the lower jaw 26, similar to upper urethane pad 74. The side walls 134a, 134b extend downwardly to outwardly-extending knobs 137A, 137B, respectively, formed at the distal end of the lower housing member.

The lower housing member 62 further includes a bore 140 extending transversely through the housing member. The bore 140 is designed to receive the pointed end 84 (or pointed end 85) of piercing element 82 if the piercing element entirely penetrates a pipe to prevent damage to the piercing element 82 or to the lower housing member 62. A V-shaped notch 142 is formed at the upper opening of the bore 140 which is designed to locate and support a fluid-carrying pipe, one of which, for example, is indicated at "P" in FIGS. 5 and 6.

The upper housing member 60 and lower housing member 62 are designed to be pivotally attached to one another by aligning pivot apertures 78a, 78b in upper housing member 60 with outwardly-extending knobs 137a, 137b, respectively, in lower housing member 62. The side walls of the lower housing member can be squeezed together during assembly and the lower housing member can be slid into the upper housing member until knobs 137a, 137b are aligned with apertures 78a, 78b in the upper housing member. When the pressure is released, knobs 137a, 137b will deflect outwardly to pivotally connect the two housing members without the use of additional rivets or mechanical fasteners.

After the upper and lower housing members are pivotally connected as described above, a spring 144 is located therebetween to bias the housing members away from each other. Spring 144 is received between spring cavity 146 formed in the upper housing member 60 and spring cavity 148 formed in the lower housing member 62. The ends of the spring 144 are retained by knob 149 in upper spring cavity 146 and knob 150 in lower spring cavity 148. Alternatively, the spring can be attached appropriately along the outside surface of the housing members.

To mount the piercing valve assembly 10 on the pair of pliers 12, the piercing valve assembly is assembled as described above, and the upper and lower jaws 60, 62 of an open pair of pliers are located within the upper and lower registers 66, 132, respectively, of the housing members, as illustrated in FIGS. 1, 5, 6, 7 and 9. The piercing valve assembly is slid onto the pair of pliers until the jaws fit relatively snugly within their respective registers. At this point, the pivot axis of the housing members defined by apertures 78A, 78B is aligned with the pivot axis 30 of the pliers, such that the piercing valve assembly moves easily in conjunction with the movement of the pliers.

To prevent the piercing valve assembly from being removed from the pair of pliers, a spring-loaded locking pin 160 (FIG. 1) is inserted through aperture 162a formed in one side wall 134a of lower housing member 62 and aperture 162b formed in the other side wall 134B of lower housing member 62. Locking pin 160 contacts the inner end of the jaw 26 to prevent the piercing valve assembly from being removed from the pliers. Locking pin 160 preferably comprises a Cotterless cleviss pin which can be easily inserted through the apertures and locked therein, and easily removed therefrom when it is desired to remove the piercing valve assembly from the pair of pliers.

During use, a tube, pipe, or other fluid-carrying conduit, is located within V-shaped notch 142 of lower housing member 62 with the pliers in their open position, as illustrated in FIG. 5. The pliers are then manually manipulated to bring the jaws together and force the piercing element 82 through the wall of the pipe, as illustrated in FIG. 6. Adjustment of the pliers may be necessary to lock the pliers around the pipe. When the piercing element penetrates and seals to the wall of the pipe, fluid flows through the hollow central bore of the piercing element, through the bore 90 formed in the upper housing member, and out through bore 124 formed in valve tube 122 to a remote storage container or vessel. The valve assembly 130 prevents fluid from flowing in the opposite direction into the pipe from the remote storage container, while sleeve 114 prevents leakage around the piercing element.

After the pipe has been emptied, the pliers are manipulated to open the jaws, thereby removing the piercing element 82 from the pipe. When the first pointed end 84 of piercing element 82 becomes dull or otherwise unusable, the piercing element can be removed from the upper housing member 60 by unscrewing spacer element 98, reversed, and replaced such that opposite, second pointed end 85 can be used to penetrate a pipe.

Accordingly, as described above, the present invention provides a novel and unique fluid recovery tool which can be used to penetrate a pipe to drain fluid therefrom. The recovery tool includes a piercing valve assembly which can be easily mounted to a conventional pair of pliers for fluid recovery and removed therefrom when not needed such that the pair of pliers can also be used in a conventional manner.

Although the invention has been shown and described with respect to a certain preferred embodiment, it is obvious that equivalent alterations and modifications will occur to others skilled in the art upon their reading and understanding of the specification. The present invention includes all such equivalent alterations and modifications, and is limited only by the scope of the following claims.

What is claimed is:

1. A tool for forming an opening in a wall of a pipe, comprising:
    a pair of pliers having two handles pivotally attached and moveable with respect to each other by a pivot pin having a pivot axis, each handle including a handle portion and a jaw, with said jaws being located in opposed moveable relation to one another,
    a piercing valve assembly removably mounted to said pair of pliers, said piercing valve assembly including a pair of housing members pivotally attached to each other by a pivot device independent of said pivot pin and which is essentially coaxial with said pivot axis, one of said pair of housing members having a portion thereof in engagement with one of said jaws and being removably mounted thereto, and the other of said pair of housing members having a portion thereof in engagement with the other of said pair of jaws and being removably mounted thereto,
    said piercing valve assembly further including a piercing element mounted in one of said housing members for piercing and sealing to the pipe, and a conduit for fluidly connecting said piercing element with a remote storage container, the other of said pair of housing members being designed to receive and locate the pipe such that the handle portions of the pliers can be manually manipulated to bring the housing members together and force the piercing element through the wall of the pipe.

2. A tool as in claim 1, wherein said piercing element comprises a hollow tube having a first pointed end, said piercing element being removably mounted in said first of said housing members with said first pointed end extending outwardly therefrom for piercing the pipe and draining a fluid in the pipe through the piercing element.

3. A tool as in claim 2, wherein said piercing element also has a second pointed end, said piercing element being removable from said one of said housing members, reversible, and replaceable in said one of said housing members such that the second pointed end extends outwardly therefrom for piercing the pipe.

4. A tool as in claim 3, further including a spacer element mounting said piercing element to said one of said housing members, said spacer element having a threaded outer wall, and said one of said housing members having an inner threaded bore, said threaded outer wall of said spacer element being removably threaded in said inner threaded bore such that said piercing element can be easily removed from said one of said housing members, reversed, and replaced therein.

5. A tool as in claim 4, wherein said spacer element includes a flexible sleeve at least partially surrounding said piercing element, such that when said housing members are brought together and said piercing element pierces the pipe, the sleeve seals against the pipe to prevent the fluid in the pipe from leaking around the piercing element.

6. A tool as in claim 5, wherein a groove is formed centrally in the outer wall of said piercing element between said piercing element and said spacer element, and a sealing member is received within said groove for fluidly sealing the piercing element to the spacer element.

7. A tool as in claim 1, further including spring means for biasing said pair of housing members away from each other and against a respective jaw of the pliers.

8. A tool as in claim 7, further including a locking pin connected to one of said pair of housing members and extending between the handle portions of said pair of pliers to prevent the pair of housing members from being removed from said pair of pliers, said locking pin being removable to enable said pair of housing members to be removed from said pair of pliers when desired.

9. A tool as in claim 1 or claim 8, wherein each of said housing members includes a register receiving a respective jaw portion, each of said registers having a configuration which prevents said housing members from substantial movement with respect to each jaw portion, but enabling said jaw portions to be easily removed from said piercing valve assembly.

10. A tool as in claim 9, wherein said pair of pliers includes a first handle provided with a first stationary jaw, a second handle provided with a moveable jaw for co-action with said stationary jaw, a toggle link pivotally connected at one end to said second handle and engaged with said moveable jaw, and engaged at the other end with an adjusting screw, and a release lever pivotally connected to said second handle and engaged at one end to said toggle link.

11. An attachment designed to be removably mounted to a pair of pliers for forming an opening in a wall of a pipe, wherein said pliers includes first and second handles pivotally mounted on a pivot pin having a pivot axis, and wherein said handles have first and second jaws respectively, said attachment comprising:
    a piercing valve assembly including a pair of housing members pivotally attached to each other by a pivot device independent of said pivot pin, one of said pair of housing members being designed to receive said first jaw of the pair of pliers and to be removably mounted thereto, and the other of said pair of housing members being designed to receive said second jaw of the pair of pliers and to be removably mounted thereto with the pivot device being essentially coaxial with said pivot axis, said piercing valve assembly further including a piercing element mounted in one of said housing members for piercing and sealing to the pipe, and a conduit for fluidly connecting said piercing element with a remote storage container, said other of said pair of housing members being designed to receive and locate the pipe such that the handle portions of the pliers can be manually manipulated to bring the housing members together and force the piercing element through the wall of the pipe.

12. An attachment as in claim 11, wherein said piercing element comprises a hollow tube having a first pointed end, said piercing element being removably mounted in said first of said housing members with said first pointed end extending outwardly therefrom for piercing the pipe and draining a fluid in the pipe through the piercing element.

13. An attachment as in claim 12, wherein said piercing element also has a second pointed end, said piercing element being removable from said one of said housing members, reversible, and replaceable in said one of said housing members such that the second pointed end extends outwardly therefrom for piercing the pipe.

14. An attachment as in claim 13, further including a spacer element mounting said piercing element to said one of said housing members, said spacer element having a threaded outer wall, and said one of said housing members having an inner threaded bore, said threaded outer wall of said spacer element being removably threaded in said inner threaded bore such that said piercing element can be easily removed f rom said one of said housing members, reversed, and replaced therein.

15. An attachment as in claim 14, wherein said spacer element includes a sleeve at least partially surrounding said piercing element, such that when said housing members are brought together and said piercing element pierces the pipe, the sleeve seals against the pipe to prevent the fluid in the pipe from leaking around the sleeve.

16. An attachment as in claim 15, wherein a groove is formed centrally in the outer wall of said piercing element between said piercing element and said spacer element, and a sealing member is received within said groove for fluidly sealing the piercing element to the spacer element.

17. An attachment as in claim 11, further including spring means for biasing said pair of housing members away from each other.

18. An attachment as in claim 11 or claim 19, wherein each of said housing members includes a register configured to receive one of said jaws of the pair of pliers.

19. A tool for forming an opening in a wall of a pipe, comprising:
a pair of pliers having two handles pivotally attached and moveable with respect to each other by a pivot pin having a pivot axes, each handle including a handle portion and a jaw, with said jaws being located in opposed moveable relation to one another,
a piercing valve assembly mounted to said pair of pliers, said piercing valve assembly including a pair of housing members pivotally attached to each other by a pivot device independent of said pivot pin and which is essentially coaxial with said pivotal axis, and moveable in conjunction with said jaws,
said piercing valve assembly further including a piercing element mounted in one of said housing members for piercing ad sealing to the pipe, said piercing element comprising a hollow element having first and second pointed ends, said piercing element being removably mounted in said first df said housing members with said first pointed end extending outwardly therefrom for piercing the pipe and draining a fluid in the pipe through the piercing element, said piercing element being removable from said one of said housing members, reversible, and replaceable in said one of said housing members such that the second pointed end extends outwardly therefrom for piercing the pipe,
said piercing valve assembly also including a conduit for fluidly connecting said piercing element with a remote storage container, the other of said pair of housing members being deigned to receive and locate the pipe such that the handle portions of the pliers can be manually manipulated to bring the housing members together and force the piercing element through the wall of the pipe.

20. A tool as in claim 19, further including a spacer element mounting said piercing element to said one of said housing members, said spacer element having a threaded outer wall, and said one of said housing members having an inner threaded bore, said threaded outer wall of said spacer element being removably threaded in said inner threaded bore such that said piercing element can be easily removed from said one of said housing members, reversed, and replaced therein.

21. A tool as in claim 20, wherein said spacer element includes a flexible sleeve at least partially surrounding said piercing element, such that when said housing members are brought together and said piercing element pierces the pipe, the sleeve seals against the pipe to prevent the fluid in the pipe from leaking around the piercing element.

22. A method for draining fluid in a pipe, comprising the following steps:
providing a pair of pliers having two handles pivotally attached and moveable with respect to one another by a pivot pin having a pivot axis, each handle having a handle portion and a jaw, wherein said jaws are located in opposed moveable relation to one another,
providing a piercing valve assembly comprising a pair of housing members pivotally attached to each other by a pivot device independent of said pivot pin, said piercing valve assembly including a bias device urging said housing members away from each other, one of said pair of housing members being designed to receive one of said jaws in engagement therewith and be removably mounted thereto, and the other of said pair of housing members being designed to receive the other of said pair of jaws in engagement therewith and to be removably mounted thereto,
mounting each housing member on a respective jaw of said pair of pliers with said pivot device being located essentially coaxial with said pivot axis, inserting a locking pin through apertures formed in said housing members to prevent said housing portions from being removed form said pair of pliers during use, said bias device urging said housing members against a respective jaw of the pair of pliers when the housing members are mounted to the pair of pliers, and allowing said handle portions of the pair of pliers to be squeezed together to bring the housing members together.

23. A method as in claim 22 further including locating a pipe between said housing members and squeezing said handle portions to bring the housing members together, said piercing valve assembly including a piercing element which pierces the pipe to create a hole in the pipe when said handle portions are squeezed together.

* * * * *

UNITED STATES PATENT AND TRADEMARK OFFICE
CERTIFICATE OF CORRECTION

PATENT NO. : 5,291,914

DATED : March 8, 1994

INVENTOR(S) : Bares, et al.

It is certified that error appears in the above-identified patent and that said Letters Patent is hereby corrected as shown below:

Column 9, Line 58: "claim 19" should be --claim 17--

Column 11, Line 4: Please change "form" to --from--

Signed and Sealed this

Fifth Day of July, 1994

BRUCE LEHMAN

*Attest:*

*Attesting Officer*     *Commissioner of Patents and Trademarks*